United States Patent
Veeramuthu et al.

(10) Patent No.: US 11,405,349 B1
(45) Date of Patent: Aug. 2, 2022

(54) VIRAL MESSAGE DETECTION AND CONTROL IN SOCIAL MEDIA MESSAGING

(71) Applicant: INTERNATIONAL BUSINESS MACHINES CORPORATION, Armonk, NY (US)

(72) Inventors: Muthukumaran Veeramuthu, Puducherry (IN); Sujoy Sett, Kolkata (IN); Shreeya Joshi, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/227,758

(22) Filed: Apr. 12, 2021

(51) Int. Cl.
| H04L 51/52 | (2022.01) |
| H04W 4/14 | (2009.01) |
| H04W 4/21 | (2018.01) |
| H04L 51/58 | (2022.01) |
| H04L 51/234 | (2022.01) |

(52) U.S. Cl.
CPC .............. *H04L 51/32* (2013.01); *H04L 51/34* (2013.01); *H04L 51/38* (2013.01); *H04W 4/14* (2013.01); *H04W 4/21* (2018.02)

(58) Field of Classification Search
CPC ......... H04L 51/32; H04L 51/34; H04L 51/38; H04W 4/21; H04W 4/14
See application file for complete search history.

(56) References Cited

U.S. PATENT DOCUMENTS

| 8,458,046 | B2 | 6/2013 | Myslinski |
| 8,768,782 | B1* | 7/2014 | Myslinski ............... G06F 16/95 |
| | | | 705/26.1 |
| 8,943,135 | B2 | 1/2015 | Johnmar |
| 9,875,234 | B2 | 1/2018 | Myslinski |
| 10,198,491 | B1* | 2/2019 | Semturs ................ G06F 16/951 |
| 10,402,745 | B2 | 9/2019 | Papadopoullos et al. |
| 10,642,936 | B2 | 5/2020 | Arquero et al. |
| 2013/0103667 | A1* | 4/2013 | Minh ...................... H04L 51/32 |
| | | | 707/709 |
| 2014/0088944 | A1 | 3/2014 | Natarajan et al. |

(Continued)

FOREIGN PATENT DOCUMENTS

WO     2020061578     3/2020

OTHER PUBLICATIONS

Anonymous, "Sentiment Analysis Innovation Sources—Breakthrough Analysis", http://breakthroughanalysis.com/2014/02/21/sentiment-analysis-innovation/, Feb. 21, 2014, 9 pages.

*Primary Examiner* — Austin J Moreau
(74) *Attorney, Agent, or Firm* — Scott Dobson; Andrew D. Wright; Roberts Calderon Safran & Cole, P.C.

(57) ABSTRACT

A method includes: detecting, by a computing device, a copy action involving a social-meta-string (SMS) in a message; determining, by the computing device, a copy count of the SMS is greater than a count threshold; determining, by the computing device, a content score of the message is greater than a content threshold; determining, by the computing device, whether a fact check score of the message is greater than a fact check threshold; in response to the fact check score of the message being greater than the fact check threshold, permitting sending of the message; and in response to the fact check score of the message being less than the fact check threshold, blocking the sending of the message.

18 Claims, 6 Drawing Sheets

(56) References Cited

U.S. PATENT DOCUMENTS

| | | |
|---|---|---|
| 2015/0012336 A1 | 1/2015 | Leach et al. |
| 2015/0248736 A1 | 9/2015 | Myslinski |
| 2015/0350149 A1 | 12/2015 | Acharya et al. |
| 2016/0117328 A1 | 4/2016 | Mondal et al. |
| 2016/0164812 A1* | 6/2016 | Chang ................ H04L 63/1441 726/26 |
| 2018/0114136 A1 | 4/2018 | Kumar et al. |
| 2018/0189668 A1* | 7/2018 | Ray ........................ G06Q 50/01 |
| 2019/0199519 A1* | 6/2019 | Goyal ................... G06F 16/215 |
| 2020/0389497 A1* | 12/2020 | Cam-Winget ...... H04L 41/0893 |
| 2021/0089579 A1* | 3/2021 | Shu ........................ H04L 51/32 |

\* cited by examiner

VIRAL MESSAGE DETECTION AND CONTROL IN SOCIAL MEDIA MESSAGING

BACKGROUND

Aspects of the present invention relate generally to social media messaging and, more particularly, to viral message detection and control in social media messaging.

Social media messaging platforms permit a user to send messages to, and receive messages from, other users via user devices. String type is a standard data type used across nearly all websites and applications, including those used by messaging platforms.

SUMMARY

In a first aspect of the invention, there is a computer-implemented method including: detecting, by a computing device, a copy action involving a social-meta-string (SMS) in a message; determining, by the computing device, a copy count of the SMS is greater than a count threshold; determining, by the computing device, a content score of the message is greater than a content threshold; determining, by the computing device, whether a fact check score of the message is greater than a fact check threshold; in response to the fact check score of the message being greater than the fact check threshold, permitting sending of the message; and in response to the fact check score of the message being less than the fact check threshold, blocking the sending of the message.

In another aspect of the invention, there is a computer program product including one or more computer readable storage media having program instructions collectively stored on the one or more computer readable storage media. The program instructions are executable to: determine a copy count of a social-meta-string (SMS) is greater than a count threshold, wherein the SMS is in a message initiated in a social media messaging application, and the SMS is a data structure comprising a string, a creation timestamp, and the copy count; determine a content score of the message is greater than a content threshold; determine whether a fact check score of the message is greater than a fact check threshold; in response to the fact check score of the message being greater than the fact check threshold, permit the social media messaging application to send the message; and in response to the fact check score of the message being less than the fact check threshold, block the social media messaging application from sending the message.

In another aspect of the invention, there is system including a processor, a computer readable memory, one or more computer readable storage media, and program instructions collectively stored on the one or more computer readable storage media. The program instructions are executable to: detect a copy action involving a social-meta-string (SMS) in a message, wherein the SMS is a data structure comprising a string, a creation timestamp, and the copy count; increment the copy count of the SMS; determine the copy count of the SMS is greater than a count threshold; determine a content score of the message is greater than a content threshold; determine whether a fact check score of the message is greater than a fact check threshold; in response to the fact check score of the message being greater than the fact check threshold, permit sending of the message; and in response to the fact check score of the message being less than the fact check threshold, block the sending of the message.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
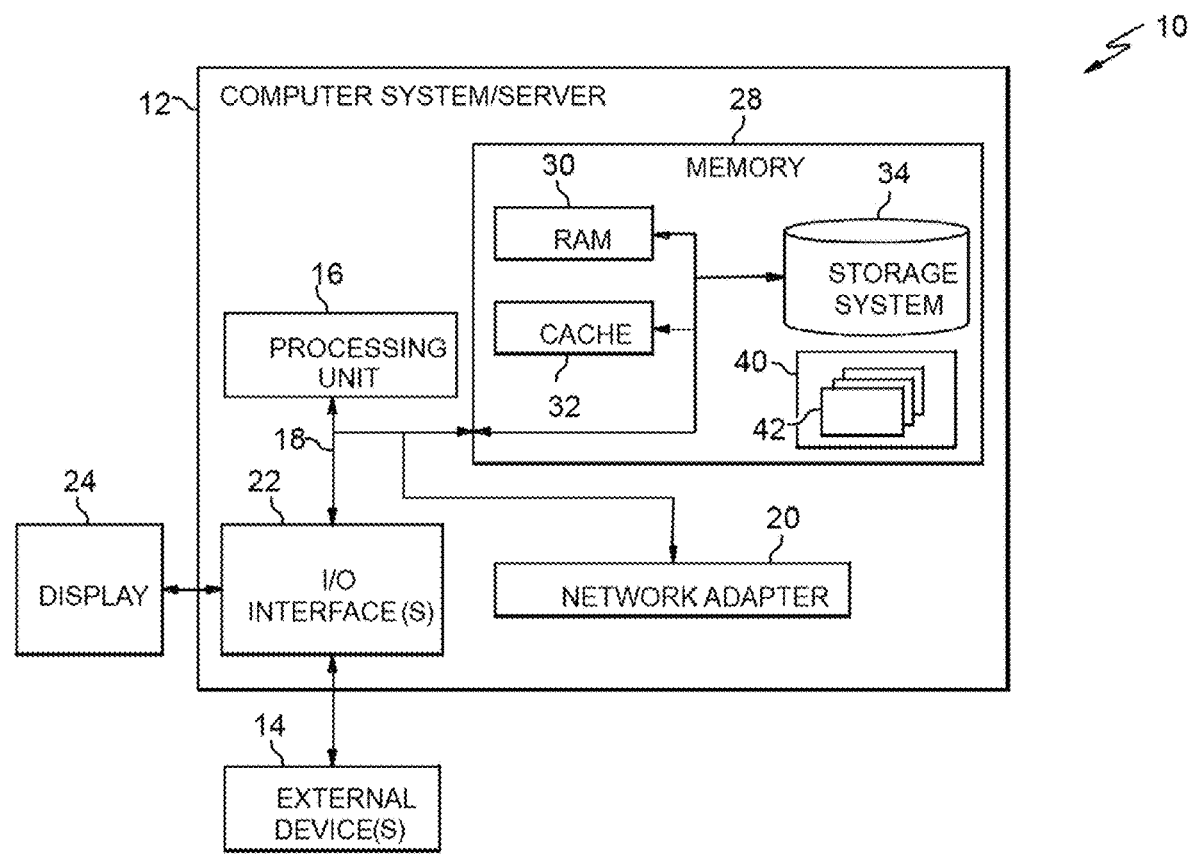
FIG. 1 depicts a computer infrastructure according to an embodiment of the present invention.

Aspects of the present invention relate generally to social media messaging and, more particularly, to viral message detection and control in social media messaging. Aspects of the invention discard the use of the standard string data type and instead use a new data type referred to as a social-meta-string (SMS). The SMS comprises metadata including a copy count, which indicates a number of times a particular SMS has been copied in one or more social media messaging applications. In embodiments, when a user initiates a message in a messaging application, the system uses the copy count to determine whether an SMS in the message is deemed viral. If the message contains an SMS that is deemed viral, the system determines whether to permit sending the message or block the message based on a determined emotion of the message, a determined influence of the message, and a fact check of the message.

Fake message circulation and unwanted impact or agitation arising out of misinformation have become major social issues. This is one of the side-effects of the advanced communication era. Implementations of the invention address these issues by blocking certain message that are deemed to be viral, of a certain emotion and influence, and that do not pass a fact check.

As described herein, embodiments of the invention utilize a new data type/HTML element referred to as a social-meta-string (SMS) that acts locally using the operating system and that retains its attributes when posted in the Internet. In embodiments, the SMS includes three types of data: content, creation timestamp, and copy count. The SMS may include other data in addition to the content, creation timestamp, and copy count. In embodiments, the SMS can be used as a standard that all social media messaging applications implement. Implementations involve an operating system (OS) handled copy action when acting on a SMS to facilitate cross application copying, pasting, and forwarding content in social media messaging applications.

In embodiments, any copy or merge action involving a particular SMS in any social media messaging application increments the copy count of that particular SMS by a unit. For example, when a copy action involving a particular SMS happens from one string field to another, through an operating system, or across different messaging applications on a user device, the content and creation timestamp of the SMS is carried forward, and the copy count of the SMS is incremented by a unit. In another example, when a merge involves copying multiple instances of a same SMS from multiple sources, the earliest creation timestamp of the multiple instances of the SMS is carried forward with the merged SMS, and the largest copy count of the multiple instances of the SMS is incremented by a unit and carried forward with the merged SMS.

Implementations of the invention control functions of a computing device by utilizing a program module installed in the operating system of the computing device. The control of these functions by the program module in the operating system improves the technology of social media messaging by detecting viral messages that are deemed to have a particular combination of emotion and influence, and by blocking (e.g., preventing) the computing device from sending such detected messages when the messages also do not pass a fact check. Implementations of the invention perform these functions using a new data type referred to as a social-meta-string data type.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
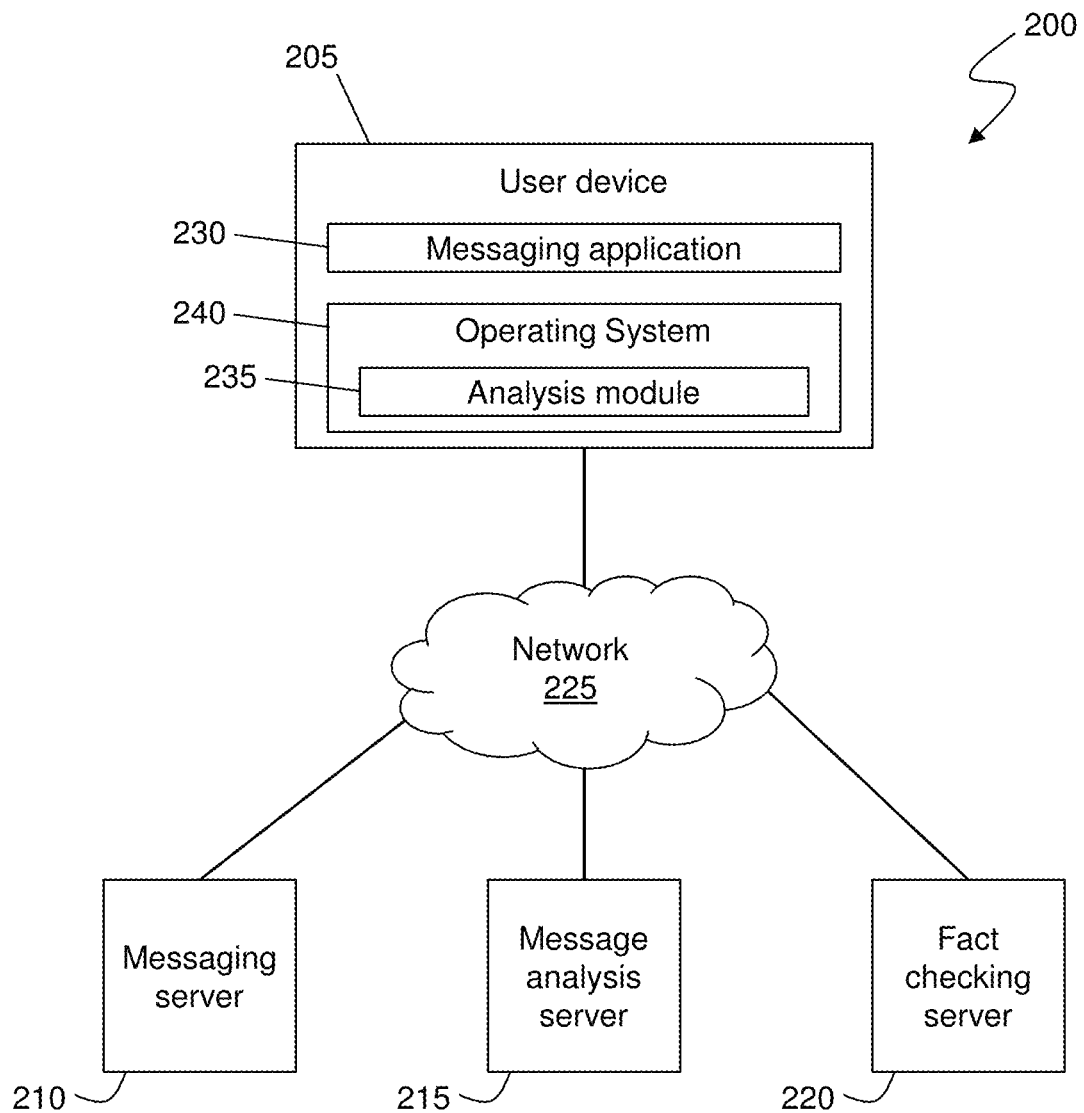
FIG. 2 shows a block diagram of an exemplary environment in accordance with aspects of the invention.

FIG. 2 shows a block diagram of an exemplary environment 200 in accordance with aspects of the invention. In embodiments, the environment 200 includes a user device 205, a messaging server 210, a message analysis server 215, and a fact checking server 220 all connected via a network 225. The network 225 may be a suitable communication network or combination of communication networks including one or more of a LAN, WAN, and the Internet.

The user device 205 is a computing device that comprises one or more elements of the computer system 12. For example, the user device 205 may comprise a smartphone, a tablet computer, a laptop computer, a desk top computer. In embodiments, the user device 205 stores and runs a messaging application 230, which is a software application program that is configured to permit a user of the user device 205 to send messages to, and receive messages from, other users via a messaging platform hosted by the messaging server 210. Examples of messaging platforms include but are not limited to Facebook, WhatsApp, LinkedIn, and Twitter. The user device 205 may store and run plural different messaging applications 230 that correspond to plural different messaging platforms hosted by plural different messaging servers 210. In some implementations the messaging platform is web based, in which case the messaging application 230 may comprise a browser application that permits a user to access a website hosted by the messaging server 210. In the web based implementation, the user is able to send messages to, and receive messages from, other users via the messaging platform when the user is logged into the website hosted by the messaging server 210. In implementations, there may be plural such user devices 205 connected to the network 225, as in the case of plural different users each having their own user device 205 that is usable for social media messaging.

In embodiments, the user device 205 comprises an analysis module 235, which may comprise one or more program modules such as program modules 42 described with respect to FIG. 1. In some embodiments, the analysis module 235 is part of the operating system 240 of the user device 205. In accordance with aspects of the invention, the analysis module 235 is configured to perform one or more of the processes described herein, including for example: determining an extent of a copied string contained in a message; comparing a copy count of the copied string to a threshold; obtaining a content score of the message; obtaining a fact check score of the message; and approving or blocking the message.

The user device 205 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Still referring to FIG. 2, the messaging server 210 comprises one or more computing devices (e.g., such as computer system 12) that hosts a messaging platform that permits the user of user device 205 to send messages to, and receive messages from, other users via a messaging platform.

In embodiments, the message analysis server 215 comprises one or more computing devices (e.g., such as computer system 12) that determines a content score for a message based on a sentiment analysis of the message and an influence score of the message. In embodiments, the message analysis server 215 performs a sentiment analysis on a message received from the user device 205 or the messaging server 230. In one example, the sentiment analysis characterizes the message as having one of plural predefined emotions (e.g., optimism, disapproval, admiration, aggressiveness, etc.). Any suitable set of predefined emotions may be used. The sentiment analysis may be performed using sentiment analysis techniques that return the determined emotion for a particular message. In embodiments, the message analysis server 215 also determines an influence score for the message. In one example, the influence score of a message is a score that is an estimated measure of influence and/or impact the message is determined to have on a reader of the message. The influence score may be determined using influence scoring techniques that return an influence score for a particular message.

With continued reference to the message analysis server 215, in embodiments the message analysis server 215 determines a content score for the message based on both the sentiment analysis and the influence score. In one example, each of the plural predefined emotions is assigned a respective point value. In embodiments, the content score for a message is a mathematical function (e.g., a sum) of the influence score and the point value of the emotion determined using the sentiment analysis. By appropriately assigning the respective point values to the respective emotions, and by appropriately setting a range of the influence score, a designer can ensure that only certain combinations of emotions and influence score create a content score that exceeds a predefined content threshold, thus causing a fact check as described herein.

In embodiments, the fact checking server 220 comprises one or more computing devices (e.g., such as computer system 12) that performs a fact check on a message received from the user device 205 or the messaging server 230. In one example, the fact checking server 220 determines a fact check score for the message, e.g., by analyzing the message and comparing it to fact sources. In one example, the fact check score of a message is a score that is a measure of accuracy of content of the message. For example, the fact check score may be a numerical value between 0 and 1, with lower values indicating the message has relatively lower factual accuracy and higher values indicating the message has relatively higher factual accuracy. The fact check score may be determined using fact checking techniques that return a fact check score for a particular message. In embodiments, the fact checking server 220 is part of a central fact validation mechanism that is trusted for factual accuracy of information. For events, situations, or information where the truth is not verifiable or available, the information is reported as uncertain. For example, some factual events such as the outcome of a sporting match, weather reports, happenings at some event, etc., are trusted facts. On the other hand, opinion about events, judgmental conditions, etc., are uncertain facts and truth cannot always be anonymously detected for such cases. In embodiments, the fact checking server 220 is maintained and operated by a trusted service provider that uses natural language processing (NLP) techniques and trusted news/information sources to detect the certainty or factualness of a message that is being sent on any messaging platform.

With continued reference to FIG. 2, in accordance with aspects of the invention, the analysis module 235 is configured to analyze a message that the user attempts to send via the messaging application 230 and, based on the analysis, to either permit the message to be sent or block the message from being sent. In embodiments, the analysis is based at least in part on a copy count of a string contained in the message. In implementations, the analysis module 235 compares the copy count of the string to a predefined threshold value. In response to the copy count being less than the threshold, the analysis module 235 permits sending the message (e.g., via the messaging application 230). In response to the copy count being greater than or equal to the threshold, the analysis module 235 deems the message to be viral and further analyzes the message based on a returned result from the message analysis server 215 and, if appropriate, a returned result from the fact checking server 220. Based on the result from the message analysis server 215 (and the result from the fact checking server 220, if obtained), the analysis module 235 determines whether to permit or block the sending of the message via the messaging application 230.

Figure 3:
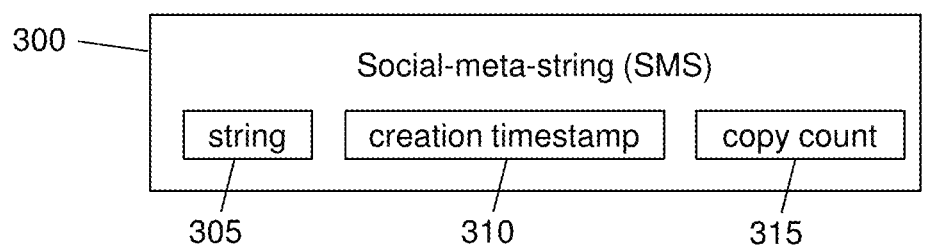
FIG. 3 shows a block diagram of a social-meta-string data structure in accordance with aspects of the invention.

According to aspects of the invention, the copy count of a string is stored as metadata in a new data type that is referred to as a "social-meta-string" (abbreviated herein as "SMS"). In embodiments, and as illustrated in FIG. 3, the SMS 300 is a data type that includes a string 305 (e.g., string content), a creation timestamp 310, and a copy count 315. In one example, the string 305 is an array of bytes with each byte storing a character, such as a Hypertext Markup Language (HTML) string. In embodiments, the creation timestamp 310 is a timestamp (e.g., date and time) that this SMS 300 was first created in the messaging application 230 or another participating messaging application. In embodiments, the copy count 315 is a value that corresponds to a number of times this SMS 300 has been copied or merged in the messaging application 230 or another participating messaging application. In one example, the copy count 315 indicates a numbers of times the SMS 300 (and thus the string 305 included in the SMS 300) has been sent from one user to another user and, thus, can be used as a measure of whether or not the string 305 should be considered viral. In embodiments, the SMS 300 retains its attributes (e.g., the metadata) when posted in the Internet.

Figure 4:
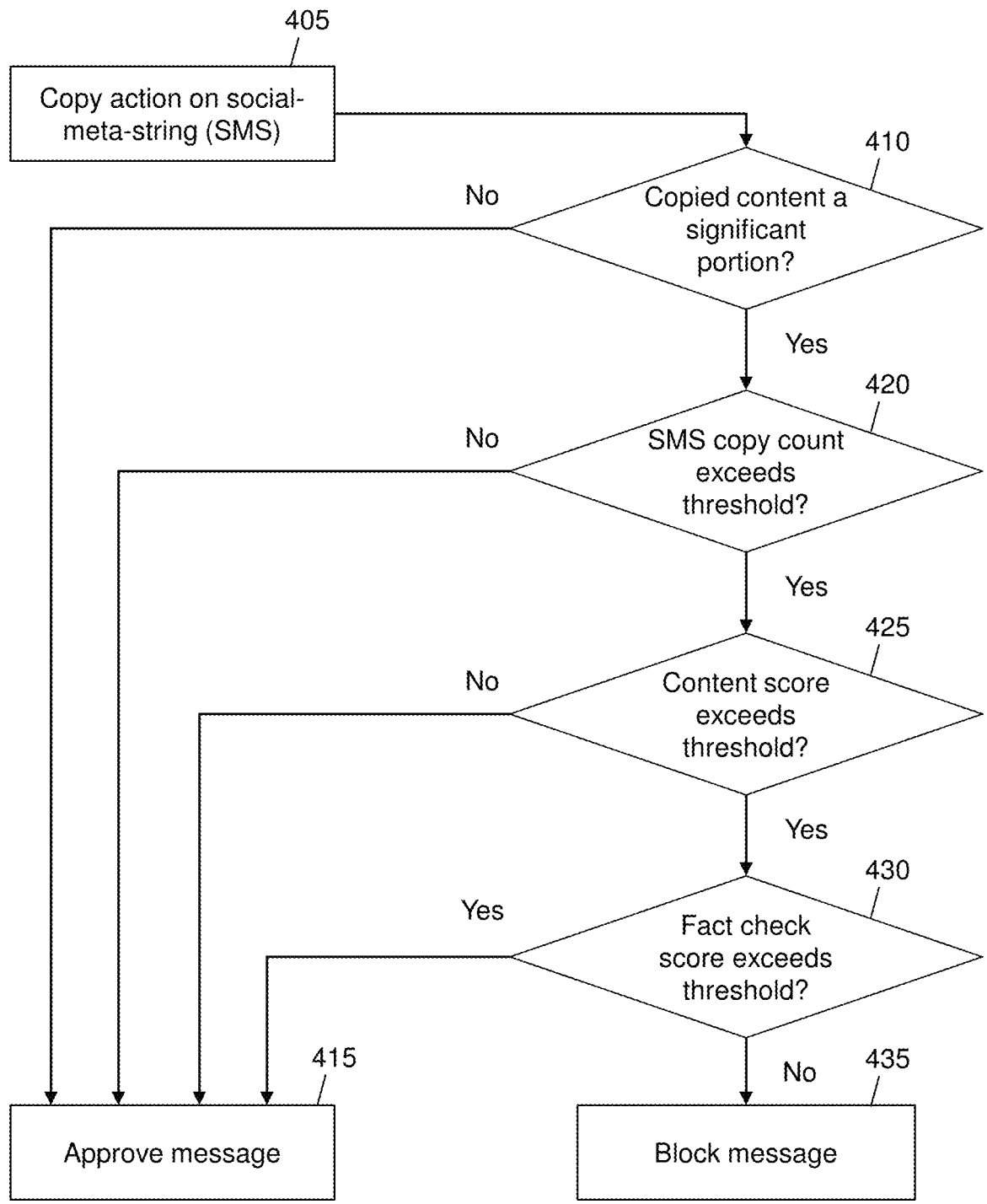
FIG. 4 shows a flowchart of an exemplary method in accordance with aspects of the invention.

FIG. 4 shows a flowchart of an exemplary method in accordance with aspects of the present invention. Steps of the method may be carried out in the environment of FIG. 2 and are described with reference to elements depicted in FIG. 2.

At step 405, the system detects a copy action on a social-meta-string (SMS) in a message. In embodiments, and as described with respect to FIG. 2, a user of the user device 205 utilizes the messaging application 230 to initiate a message that includes content from another message that this user has previously received from another user. In one example, a copy action is any action that causes a change in memory address of a string. Non-limiting examples of initiating a message that includes a copy action include: posting a copied message to a wall; forwarding a previously received message; and copying text and pasting the copied text into a text field of a message to be sent. In embodiments, the messaging application 230 detects the copy action in the initiated message and notifies the analysis module 235 of the copy action, such that detecting in this context comprises receiving a notification from the messaging application 230. In other embodiments, operating system 240 detects the copy action by monitoring actions performed within the messaging application 230.

At step 410, the system determines whether the copied content in the initiated message is a significant portion of the message from which it was copied. In some instances, the content that is copied as part of the copy action (at step 405) is less than the entirety of the message from which it is copied. In embodiments, the analysis module 235 compares the copied content to the message from which the copied content was copied. Based on this comparison, the analysis module 235 determines whether the copied content is a significant portion of the message from which it was copied. For example, the analysis module 235 may utilize natural language processing (or other comparison techniques) to determine a degree of similarity between the copied content and the message from which it was copied. In response to the degree of similarity being less than the predefined similarity threshold, the analysis module 235 deems the copied content as not being a significant portion of the message from which it was copied, and the process proceeds to step 415. In response to the degree of similarity being greater than the predefined similarity threshold, the analysis module 235 deems the copied content as being a significant portion of the message from which it was copied, the analysis module 235 increments the copy count in the metadata of this SMS, and the process proceeds to step 420.

At step 415, the system approves sending the message. In embodiments, the analysis module 235 instructs the messaging application 230 that the messaging application 230 is authorized to send the message from step 405. Upon receiving this instruction, the messaging application 230 sends the message via the messaging platform.

At step 420, the system determines whether the copy count of the SMS exceeds a threshold. In embodiments, the analysis module 235 compares the copy count of the SMS to a count threshold. In embodiments, the copy count used in this comparison is the copy count after being incremented at step 410. In response to the copy count for this SMS being less than the count threshold, the analysis module 235 approves sending the message at step 415. In this manner, the SMS is sent as part of the message that was initiated at step 405. On the other hand, if the copy count for this SMS is greater than the count threshold, then the process proceeds to step 425.

At step 425, the system determines whether a content score of the message exceeds a threshold. In embodiments, the analysis module 235 obtains a content score for the message initiated step 405 by requesting the content score from the message analysis server 215. In one example, the analysis module 235 sends the message initiated at step 405 to the message analysis server 215 as part of an application program interface (API) call. In response to the call from the analysis module 235, the message analysis server 215 performs a sentiment analysis on the message and determines an influence score for the message, e.g., as described with respect to FIG. 2. In embodiments, the message analysis server 215 determines the content score for the message based on both the sentiment analysis and the influence score, e.g., in the manner described with respect to FIG. 6. The message analysis server 215 then returns the determined content score to the analysis module 235, and the analysis module 235 compares the content score to a content threshold. In response to the content score for this message being less than the content threshold, the analysis module 235 approves sending the message at step 415. In response to the content score for this message being greater than the content threshold, the process proceeds to step 430.

At step 430, the system determines whether a fact check score of the message exceeds a threshold. In embodiments, the analysis module 235 obtains a fact check score for the message initiated step 405 by requesting the fact check score from the fact checking server 220. In one example, the analysis module 235 sends the message initiated at step 405 to the fact checking server 220 as part of an API call. In response to the call from the analysis module 235, the fact checking server 220 determines a fact check score for the message, e.g., as described with respect to FIG. 2. The fact checking server 220 then returns the determined fact check score to the analysis module 235, and the analysis module 235 compares the fact check score to a fact check threshold. In response to the fact check score for this message being greater than the fact check threshold, the analysis module 235 approves sending the message at step 415. In response to the fact check score for this message being less than the fact check threshold, the process proceeds to step 435.

At step 435, the system blocks the message from being sent. In embodiments, the analysis module 235 instructs the messaging application 230 that the message initiated at step 405 is not approved to send. In response to this instruction, the messaging application 230 does not send the message via the messaging platform. In embodiments, the messaging application 230 notifies the user that the message was blocked. The notification can be, for example, a visual message displayed to the user in the interface of the messaging application 230.

As thus described with respect to FIG. 4, in embodiments a message is blocked when all the following criteria are satisfied: (i) an SMS in the message has a copy count greater than a first threshold; (ii) a content score of the message is greater than a second threshold; and (iii) a fact check score of the message is less than a third threshold. In particular embodiments, the content scoring and the content threshold are configured such that messages having relatively higher aggression and influence exceed the content threshold, and messages having relatively lower aggression and influence do not exceed the content threshold. In particular embodiments, the fact check scoring and the fact check threshold are configured such that messages having relatively higher factual accuracy do not exceed the content threshold, and messages having relatively lower factual accuracy exceed the content threshold. In this manner, in embodiments the system blocks messages that satisfy the following criteria: (i) an SMS in the message has a copy count greater than a first threshold; (ii) the message has a relatively high aggression and influence; and (iii) the message relatively low factual accuracy.

Figure 5:
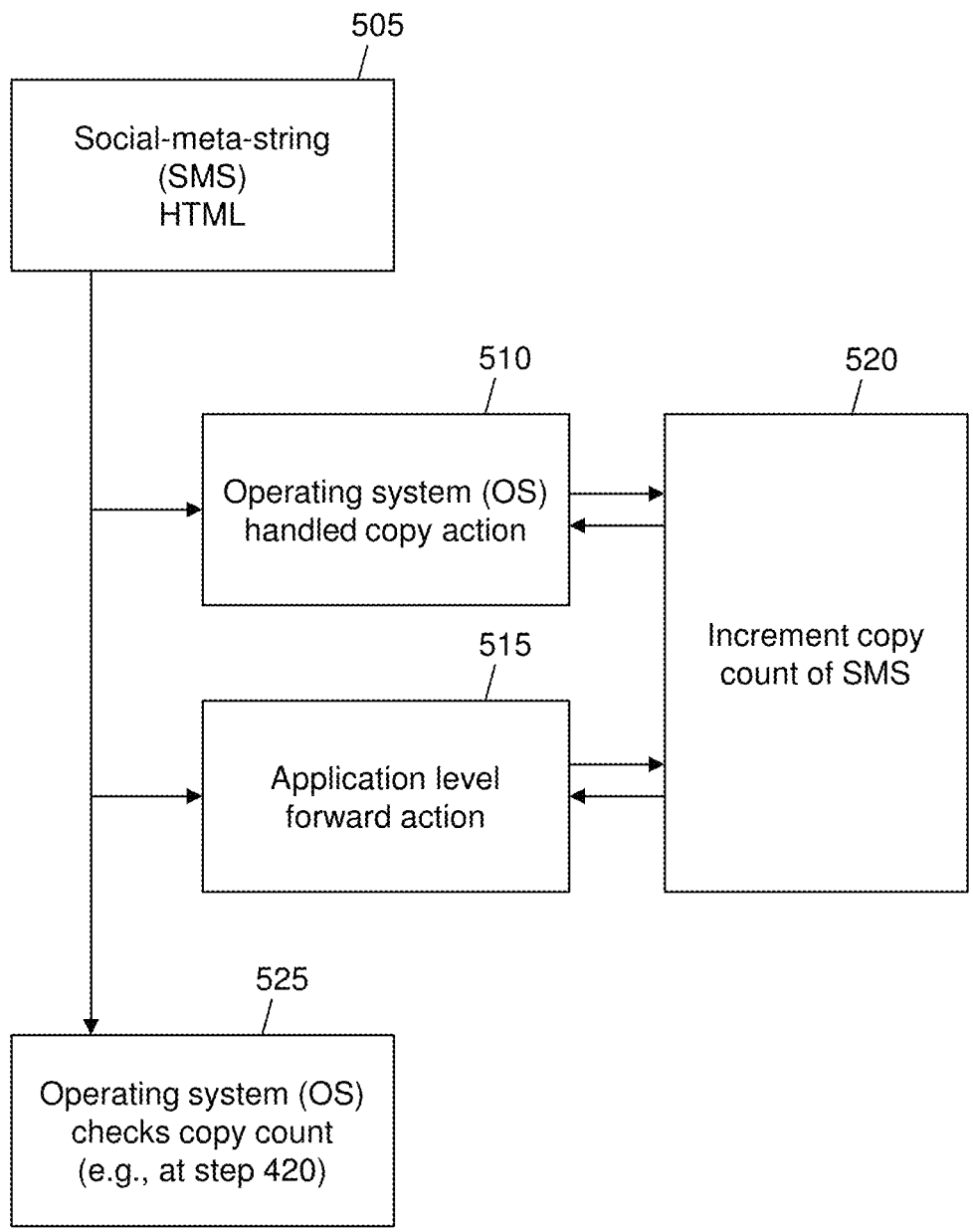
FIG. 5 shows a block diagram of incrementing the copy count of a social-meta-string in accordance with aspects of the invention.

FIG. 5 shows a block diagram of incrementing the copy count of an SMS in accordance with aspects of the invention. Block 505 represents an SMS (e.g., SMS 300) including a string, creation timestamp, and a copy count. In one example, the SMS of block 505 is included in a message that a user initiates in a messaging application, e.g., as described at step 405.

FIG. 5 depicts two examples of a copy action involving the SMS. The first example, at block 510, involves an operating system handled copy action in which the operating system of the user device performs the copy action. The second example, at block 515, involves an application level forward action in which the messaging application of the user device performs the copy action. In a particular example, the application level forward action involves a merge in which two instances of an SMS are copied from different applications and pasted into a single field in the messaging application.

In both examples, block 520 represents the operating system of the user device incrementing the copy count of the SMS. In the case of a single SMS (e.g., at block 510), the operating system changes the value of the copy count in the SMS by one unit. In the case of a merge (e.g., at block 515), the operating system determines the higher copy count of the two SMS involved in the merge and increments the copy count of that SMS. After incrementing the copy count, at block 525 the operating system then checks the copy count, e.g., as previously described at block 420.

Figure 6:
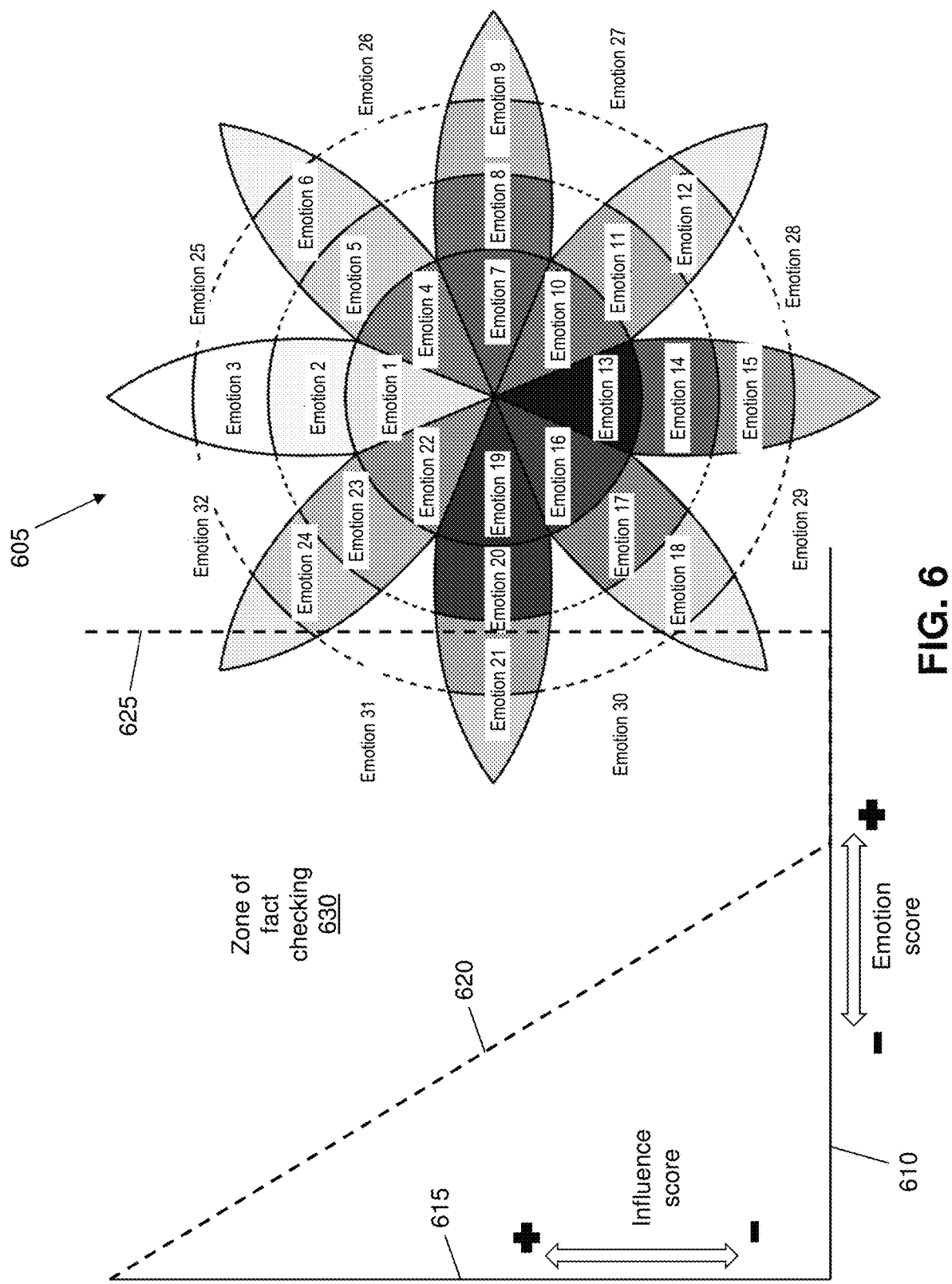
FIG. 6 shows an exemplary methodology for determining the content score in accordance with aspects of the invention.

FIG. 6 shows an exemplary methodology for determining the content score in accordance with aspects of the invention. In the example shown in FIG. 6, the message analysis server 215 determines one of plural emotions 605 (e.g., Emotion 1, Emotion 2, ... , Emotion 32) for the message using sentiment analysis. In embodiments, each one of the plural emotions 605 is assigned a predefined point value (e.g., an emotion score) that is in a range from a minimum to a maximum as indicated along axis 610. Still referring to the example of FIG. 6, the message analysis server 215 determines an influence score for the message, the influence score being a numeric value in a range from a minimum to a maximum as indicated along axis 615. In this example, the message analysis server 215 determines a content score for the message by summing the emotion score and the influence score of the message. Summing is one example, and different numerical techniques may be used to determine the content score. In this example, content scores that are to the right of line 620 and to the left of line 625 are in a zone of fact checking 630. Content scores to the left of line 620 and to the right of line 625 are outside the zone of fact checking 630. In this example, the emotion scores assigned to the plural emotions 605 and the ranges of the influence score are configured such that certain combinations of determined and influence score land in the zone of fact checking 630. For example, in particular embodiments, the ones of the plural emotions 605 that are related to aggressiveness and anger are assigned emotion scores that are higher than the emotion scores of other ones of the plural emotions 605 that are not related to aggressiveness and anger. The example shown in FIG. 6 is just one example of determining a content score, and different numerical techniques may be used in implementations of the invention.

Figure 7:
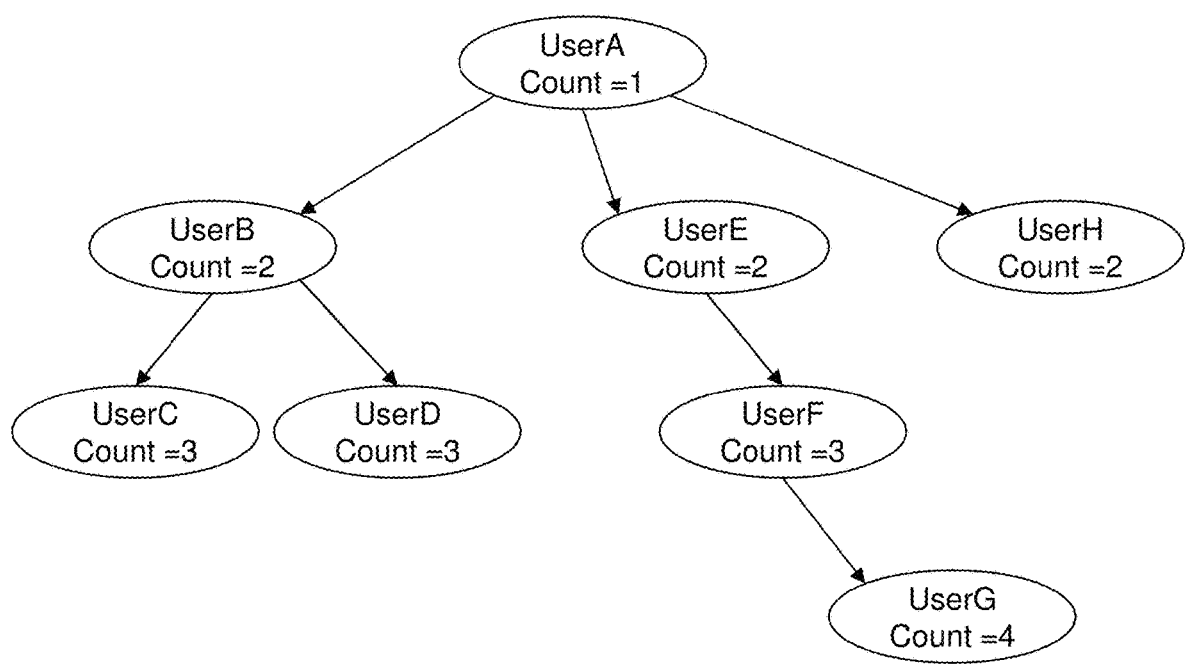
FIG. 7 shows an exemplary use case depicting how the copy count increases in accordance with aspects of the invention.

FIG. 7 shows an exemplary use case depicting how the copy count increases. UserA uses a first messaging application (e.g., Facebook) to post a message including a particular SMS to each of UserB, User E, and UserH. Subsequently, UserB copies this SMS into a message in a second messaging application (e.g., Twitter) and sends the message to UserC and UserD using the second messaging application. Additionally, UserE copies this SMS into a message in a third messaging application (e.g., LinkedIn) and sends the message to UserF. Further, UserF copies this SMS into a message in a fourth messaging application (e.g., WhatsApp) and sends the message to UserG. As seen in the figure, the copy count of the SMS increments with each successive copy action, regardless of which messaging application is used. As additionally seen in the figure, different users can have the same SMS with a different copy count because the SMS took different paths to arrive at the different users. This has the result that a first user (e.g., UserH) might have the SMS with a copy count less than the count threshold, while another user (e.g., UserG) has the same SMS but with a different copy count that is above the count threshold. In this situation, if the first user (e.g., UserH) copies the SMS into a message, that message will be sent without performing step 425 of FIG. 4 because the copy count is less than the threshold. Conversely, if the second user (e.g., UserH) copies the SMS into a message, that system will perform the check at step 425 of FIG. 4 because the copy count is greater than the threshold.

As described herein, in embodiments the SMS 300 of FIG. 3 includes at least the string 305, the creation timestamp 310, and the copy count 315. In further embodiments, the SMS includes additional metadata including one or more of: type of copy (e.g., metadata in the SMS that indicates the most recent type of copy action that was performed using the SMS); fact check flag (e.g., metadata in the SMS that indicates whether a fact check has been performed). Other types of metadata may also be included in the SMS in implementations of the invention.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   detecting, by a computing device, a copy action involving a social-meta-string (SMS) in a message;
   determining, by the computing device, a copy count of the SMS is greater than a count threshold;
   determining, by the computing device, a content score of the message is greater than a content threshold;
   determining, by the computing device, whether a fact check score of the message is greater than a fact check threshold;
   in response to the fact check score of the message being greater than the fact check threshold, permitting sending of the message; and
   in response to the fact check score of the message being less than the fact check threshold, blocking the sending of the message,
   wherein the copy action comprises a merge that involves copying multiple instances of the SMS from multiple sources.

2. The method of claim 1, wherein the SMS is a data structure comprising a string, a creation timestamp, and the copy count.

3. The method of claim 2, further comprising obtaining the content score and the fact check score from one or more external devices.

4. The method of claim 3, wherein the content score is based on a determined emotion of the message and a determined influence score of the message.

5. The method of claim 3, wherein the fact check score is based on a determined factual accuracy of the message.

6. The method of claim 1, further comprising determining the copy action involves a significant portion of the SMS.

7. The method of claim 2, wherein the message is a message initiated in a social media messaging application.

8. The method of claim 7, wherein the copy action comprises one selected from the group consisting of: posting a copied message to a wall; forwarding a previously received message; copying text in a first messaging application and pasting the copied text in the first messaging application; and copying text in a first messaging application and pasting the copied text in a second messaging application.

9. The method of claim 1, further comprising:
   carrying forward an earliest creation timestamp of the multiple instances of the SMS with a merged SMS; and
   incrementing a largest copy count of the multiple instances of the SMS; and
   carrying forward the incremented largest copy count with the merged SMS.

10. A computer program product comprising one or more computer readable storage media having program instructions collectively stored on the one or more computer readable storage media, the program instructions executable to:
    determine a copy count of a social-meta-string (SMS) is greater than a count threshold, wherein the SMS is in a message initiated in a social media messaging application, and the SMS is a data structure comprising a string, a creation timestamp, and the copy count;
    determine a content score of the message is greater than a content threshold;
    determine whether a fact check score of the message is greater than a fact check threshold;
    in response to the fact check score of the message being greater than the fact check threshold, permit the social media messaging application to send the message; and
    in response to the fact check score of the message being less than the fact check threshold, block the social media messaging application from sending the message,
    wherein the copy action comprises a merge that involves copying multiple instances of the SMS from multiple sources.

11. The computer program product of claim 10, wherein the program instructions are executable to obtain the content score and the fact check score from one or more external devices.

12. The computer program product of claim 11, wherein the content score is based on a determined emotion of the message and a determined influence score of the message.

13. The computer program product of claim 11, wherein the fact check score is based on a determined factual accuracy of the message.

14. The computer program product of claim 10, wherein the program instructions are executable to increment the copy count of the SMS.

15. A system comprising:
    a processor, a computer readable memory, one or more computer readable storage media, and program instructions collectively stored on the one or more computer readable storage media, the program instructions executable to:
    detect a copy action involving a social-meta-string (SMS) in a message, wherein the SMS is a data structure comprising a string, a creation timestamp, and a copy count;
    increment the copy count of the SMS;
    determine the copy count of the SMS is greater than a count threshold;
    determine a content score of the message is greater than a content threshold;

determine whether a fact check score of the message is greater than a fact check threshold;

in response to the fact check score of the message being greater than the fact check threshold, permit sending of the message; and in response to the fact check score of the message being less than the fact check threshold, block the sending of the message, wherein the copy action comprises a merge that involves copying multiple instances of the SMS from multiple sources.

16. The system of claim 15, wherein the program instructions are executable to obtain the content score and the fact check score from one or more external devices.

17. The system of claim 16, wherein the content score is based on a determined emotion of the message and a determined influence score of the message.

18. The system of claim 16, wherein the fact check score is based on a determined factual accuracy of the message.

* * * * *